United States Patent [19] [11] 3,757,534
Orain [45] Sept. 11, 1973

[54] UNIVERSAL JOINTS

[75] Inventor: Michel Orain, Conflans Saint-Honorine, France

[73] Assignee: Societe Anonyme: Glaenzer Spicer, Poissy, France

[22] Filed: Mar. 13, 1972

[21] Appl. No.: 234,218

[30] Foreign Application Priority Data
Apr. 6, 1971 France .............................. 7112160

[52] U.S. Cl. ........................ 64/8, 64/21, 308/207 A
[51] Int. Cl. ............................................. F16d 3/06
[58] Field of Search ................ 64/21, 9 A, 8, 17 A; 308/207 A

[56] References Cited
UNITED STATES PATENTS
3,029,617 4/1962 Marquis et al. ............................ 64/8
3,318,108 5/1967 Cadiou ....................................... 64/8
3,613,396 10/1971 Drevard et al. .......................... 64/21

Primary Examiner—Charles J. Myhre
Assistant Examiner—Randall Heald
Attorney—Donald M. Wight et al.

[57] ABSTRACT

A tripod or three arm constant velocity universal joint of the type joining a driving shaft and a driven shaft and comprising a tripod member with three laterally extending arms with rollers mounted thereon and a socket member including grooves adapted to receive the rollers for relative displacement therein. An annular member is provided for urging the rollers towards or away from the axis of the shaft on which the tripod member is mounted. The annular may be provided on one side or both of the axes of the rollers along the longitudinal axis of the shaft on which the tripod member is mounted. The annular member preferably engages the lateral surface of each of the rollers perpendicular to the axis thereof and facing the shaft, that is, nearest to the shaft. The annular member is not fixed to the tripod member nor to a retaining member which may be provided and which is fixed relative to the tripod member.

3 Claims, 5 Drawing Figures

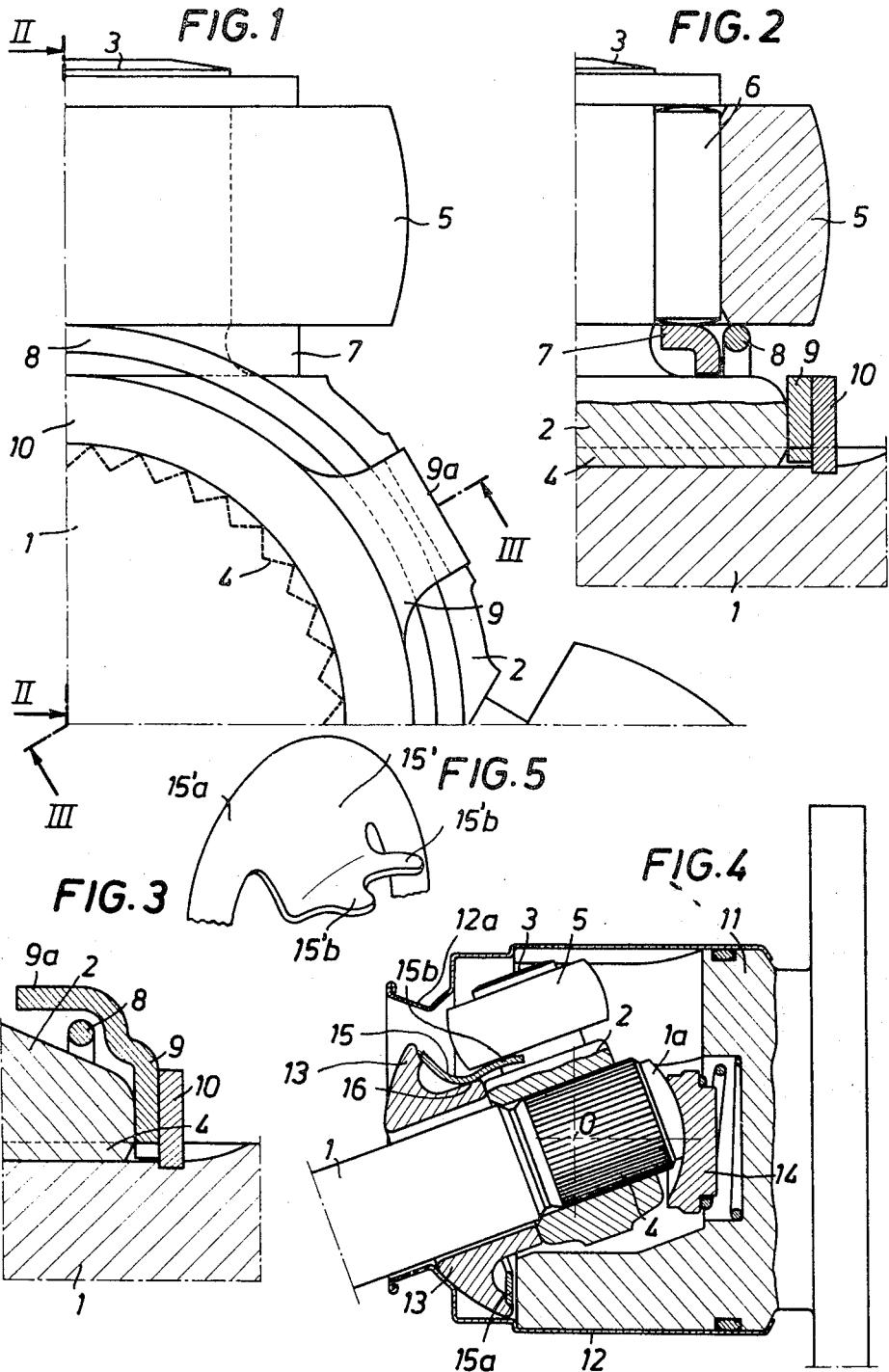

UNIVERSAL JOINTS

The present invention concerns universal joints, in particular tripod or three arm joints.

It is known that such joints are constant velocity joints and comprise a star-shaped or tripod member fixed to the driving or driven shaft and provided with three arms with rollers adapted for rolling displacement in pairs of linear grooves formed in a socket member fixed to the other of the driven or driving shaft.

In order not to leave the rollers of the tripod or three arm joints in a position during starting or reversing of the torque such that there is a knocking, it has been proposed to interpose a member at the inside or outside of the rollers and in the latter case the member is formed as a washer of resilient material and is interposed between the rollers and the body of the tripod member.

The use of such washers requires that they are capable of lasting the lifetime of the joint under difficult conditions: pass-undergoing successive changes from slight compressive forces being exerted thereon to great compressive forces twice every revolution of the joint. In fact, during each revolution of the joint and at a particular operating angle of the joint, the position of the rollers relative to tripod member is variable and characterised by two extreme positions. In one of these extreme positions, the roller has moved towards the axis a certain distance and in the other extreme position the roller has moved away from the axis three times the said distance. The distance increases approximately with the square of the operating angle of the joint.

By way of example in a joint intended for a small truck or lorry with an operating angle of 20° it is possible to have a displacement towards the axis of 1 mm and a displacement in the opposite direction of 3mm. The interposed washer which was provided to effect a pre-stressing before developing its force in the same direction, a material must be used which is capable of deflecting 4 mm. A washer having a thickness of 7 mm in its normal condition, will have to continually vary in thickness from 2 to 6 mm; moreover, allowing for a pre-stressing deflection of 1 mm already leads to the development of a sufficiently large forces for the desired result to be attained with respect to other phenomena which are present, such as inertia. Thus, there is a real difficulty in choosing the resilient material and in maintaining the continuity of the bearing surfaces.

The present invention aims at overcoming these disadvantages in providing a device for biasing the rollers of a tripod or three arm joint outwardly or inwardly without bearing on the tripod member itself.

To this end, the invention consists in a device for positioning the rollers of a tripod type universal joint outwardly or inwardly, comprising on one side or both of the tripod member longitudinally of the axis thereof, an annular shaped part in contact with each one of three rollers in order to apply thereto a force parallel to their respective axis.

It is easily understood that such an annular member is floatingly mounted with respect to the tripod member and simultaneously engages the three rollers along their axes outwardly or inwardly so that the annular member is automatically centred; accordingly, the deflections will be the same in alignment with the three rollers.

Further, it will be seen in the detailed description hereinbelow, in such a device the deformation of the annular member during rotation at a constant operating angle of the joint is only a third of the axial displacement of the rollers, which does not bring about the fatigue of the material forming the part.

In a first embodiment, the annular member is formed as a circular ring with a circular cross-section bearing against the interior lateral surface of each one of the rollers of the tripod or three-arm joint, a retaining member may be provided or not.

In another embodiment in which it is desired to centre the annular member, the latter is mounted more or less freely on a member having a radial position which is near the centre of equilibrium of the annular part; this may involve for example a sleeve traversed by the shaft carrying the tripod member and provided with a spherical collar co-operating with a spherical casing fixed to the socket member of the tripod or three arm joint.

This embodiment applies to tripod or three arm type joint which is the subject of the French Patent No. PV 20 400 66 filed on Nov. 6, 1970 and entitled "Fixed constant velocity joint with limited transverse freedom."

Other features and advantages will be brought out in the description which follows of two embodiments according to the invention given merely by way of example with reference to the accompanying drawing, in which:

FIG. 1 shows a partial end view of the shaft carrying tripod member of a universal joint;

FIG. 2 shows a partial view in section taken along the line II—II in FIG. 1;

FIG. 3 shows a view in section taken along the line III—III in FIG. 1;

FIG. 4 shows a partial axial cross section of another embodiment of a joint;

FIG. 5 is a partial view in perspective of an alternative embodiment of the annular member for the joint of FIG. 4.

FIGS. 1–3 illustrates a partial cross section perpendicular to the axis of a drive or coupling shaft 1 of a conventional tripod or three-arm universal joint.

A star-shaped or tripod member 2 having three arms, only one of these arms being shown in the figures, is mounted on the shaft 1, the tripod member being driven by the shaft 1 through splines 4. The other parts of the tripod or three-arms joint, in particular the socket, are not illustrated as they are not directly concerned with the invention.

A roller 5 is mounted on each arm or trunnion 33 of the tripod member 2 by means of a needle bearing 6 maintained by an annular ring 7.

The three rollers 5 are simultaneously and constantly urged outwardly (in the illustrated embodiment) by means of a circular ring 8 bearing on each of the three rollers only along their interior surface 5a, that is, their surface nearest the axis of the shaft 1.

The ring 8 is disposed in a plane substantially perpendicular to the axis of the shaft 1, and in this embodiment is located on the side of the tripod member facing the shaft 1 in contrast to the side of the tripod member facing the convex end (not shown) of the said shaft 1.

The ring 8 is in the form of a resilient annular member and is obviously slightly compressed so as to exert a force against each associated roller 5 substantially parallel to the axis thereof.

Finally, the device comprises an annular deflector or retaining member 9 provided with lugs 9a for retaining the ring 8 and normally out of contact therewith.

The deflector or retaining member 9 is fixed by means of the splines to the shaft 1 carrying the tripod member and is held between the tripod member 2 and a locking ring 10 fixed to the shaft 1.

The ring 8 is thus freely mounted relative to the tripod member and because the ring 8 is urged by three points angularly spaced by 120°, it is self-centring, the deflection or bending deformation in will be the same for each roller along its respective axis.

Further, it has been calculated that during the rotation at a constant operating angle of the joint, although the distance of each of the rollers 5 from the centre of the tripod member varies during a revolution, the sum of the distances of the three rollers from the centre of the tripod member remains constant.

This shows that during a revolution at a constant operating angle, the change in deflection will be practically nil. There is obviously a mean deflection caused by the joint being at an angle, but this near constant deflection is not a force which fatigues the material of the ring 8, and the size of this deflection is only one-third of the displacement of each roller.

It has been said that the ring was disposed in the present embodiment on the side facing the shaft 1, that is, remote from the convex end, it could, however, be disposed between the tripod member and the convex end of the shaft 1.

Further, an annular member identical to the ring 8 or a full functional equivalent thereof may be provided on both sides of the tripod or three arm member.

In case it will be advantageous to form the centre of the ring 8 or other functionally equivalent annular member, it is possible to have this annular member bear against another part whose radial position is itself close to the centre of equilibrium of the annular member.

FIG. 4 shows another embodiment of the device.

FIG. 4 shows more precisely a tripod or three arm joint described in the above-mentioned french patent application.

This joint comprises a drive or coupling shaft 1 driving a tripod member 2 with three arms or trunnions 3 each provided with a roller adapted to roll in one of the grooves 11a of the socket member 11. A casing 12 is fixed on the socket member 11 and ends in a spherical portion 12a whose centre is the point O and on which a retaining member 13 of synthetic or other material may slide. This member 13 is shaped as a sleeve and is traversed by the shaft 1 and co-operates with another part 14 acting as a concave seat for the convex end 1a of the shaft.

The retaining member 13 is precisely the said other part discussed above, since its centre O is near the centre of equilibrium of the annular member 15 fulfilling the function of the ring 8 of the embodiment of FIGS. 1–3.

The annular member 15 comprises a circular part 15a laterally bearing on the retaining member 13 and coaxial therewith, the three lugs face each of the rollers 5 respectively and resiently bear on the interior surface of the rollers, that is the surface facing the axis of the shaft 1, in order to urge the rollers outwardly, the centring of the annular member being effected, for example, by the interior surface of the three lugs.

It is to be noted that the mounting of the annular member 15 with respect to the retaining member 13 is only exerted for centering (bearing points 16) the annular member 15, the retaining member 13 remains rotationally free with respect to the shaft 1 and the annular member 15.

The role of the annular member 15 is obviously absolutely identical to that of the ring 8; of course, the same results are obtained as far as the deflections and the holding of the annular member 15 are concerned.

FIG. 5 illustrates an alternative embodiment of the annular part in which the part 15' comprises two lugs 15b forming a fork facing each of the rollers and partially surrounding the arms 3 of the star-shaped roller carrier.

The present invention is obviously not limited to the two illustrate embodiments described above, but it covers on the contrary all variations concerning in particular the nature and the shape of the annular member provided that the annular member bears simultaneously on the rollers for urging them outwardly or towards the centre of the tripod without bearing on the tripod.

What is claimed is:

1. In a universal joint adapted to transfer movement between a driving shaft and a driven shaft, said universal joint comprising three trunnions connected to one of said shafts and extending substantially radially with respect to the longitudinal axis thereof and angularly spaced by 120° from one another, a socket member connected to the other of said shafts and having three grooves each having two lateral walls extending in a direction generally parallel with the longitudinal axis of said other shaft, said grooves being also angularly spaced at 120° from one another, and a roller mounted for free rotation on each of said trunnions and for axial movement in a respective one of said grooves for rolling movement on said walls thereof, said rollers having a surface facing the axis of said one shaft, and a device for positioning said rollers on the respective trunnions, said device including a resilient annular member in contact with said surface of each of said rollers for exerting an outwardly directed force on said rollers, and a retaining member for said annular member attached to said one shaft independent of said annular member.

2. A device as claimed in claim 1, wherein said annular member is a circular ring having a circular cross section.

3. A device according to claim 1 wherein the annular member is in centering engagement with the retaining member.

* * * * *